Feb. 20, 1968     H. TAUBMANN     3,369,587
BURNERS FOR LIQUID, GASEOUS AND PULVERULENT FUELS
Filed April 7, 1966     2 Sheets-Sheet 1

INVENTOR.
Harro Taubmann
BY
Wenderoth, Lind & Ponack
ATTORNEYS 3,369,587
BURNERS FOR LIQUID, GASEOUS AND
PULVERULENT FUELS
Harro Taubmann, Niederhochstadt, Taunus, Germany,
assignor to Westofen G.m.b.H., Wiesbaden, Germany
Filed Apr. 7, 1966, Ser. No. 540,991
Claims priority, application Germany, Mar. 27, 1965,
W 38,850
2 Claims. (Cl. 158—1)

ABSTRACT OF THE DISCLOSURE

A burner has a combustion chamber which is cone shaped and widens conically from the fuel inlet and then narrows conically tapering after attaining a maximum cross-section. A connection is provided to the combustion chamber for a supply of recycled gas or a mixture of recycled gas and air and such connection has an opening for such gases at the maximum cross-section of the combustion chamber to supply such gases substantially tangentially to the frame.

---

The invention relates to burners for liquid, gaseous and pulverulent fuels with a combustion chamber and at least one connection for the supply of recycled gas or a mixture of recycled gas and air.

The use of heating oil for the firing of industrial furnace installations, more especially cold shaft kilns, is generally bound up with difficulties, which are ascribable to the high fuel gas temperatures. Accordingly, the expedient was adopted of supplying the burner with an inert gas, e.g. recycled gas of a furnace to be fired, in order thus to eliminate excessively high temperatures having an injurious effect on the material being treated. In this connection, it is conventional to introduce the inert gas into the burner with the combustion air or with the air introduced at the burner head. In any event, the inert gas passes through the burner headpiece into the combustion chamber region in which the combustion takes place so that, especially when operating the burner sub-stoichiometrically, the flame is extinguished when the oxygen concentration in the mixed gas falls below a certain value. In addition, "Strähnen" formation can take place and this has a deteriorating action in the subsequent burning of the residual fuel contained in the mixture in a furnace, for example in the treatment of loose material, since local overheating can occur which prejudicially affects the value of the treated material. In addition, in known burners the quantity of recycled gas to be admixed is limited on account of danger of choking the combustion procedure, so that a minimum temperature of the produced gas mixture must be maintained.

An object of the invention is to obviate the aforementioned defects and to improve the burner from the standpoint of certainty and mode of operation with as simple a structural design as possible.

A further object is realized according to the invention, by the feature that the recycled gas supply takes place in the region of the last third of the combustion chamber or at the end of the combustion area, by means of devices which produce a mixing effect with the combustion gases produced in the chamber. In this way the temperature of the gas mixture formed by the produced combustion gas with recycled gas can be regulated within wide limits by correspondingly greater or less supply of recycled gas and can be accurately adjusted to any desired treatment temperature, without fear of choking the burner flame. In addition, the mixture of the materials can be carried out intensively after the burning operation with wider possibilities in the use of suitable agents being afforded. A homogeneous hot gas mixture in turn improves the course of the treatment of the material, the value of which is thereby enhanced.

According to the invention, while preferably using combustion chambers which widen conically from the burner headpiece and then narrow down again after reaching a maximum cross-section, the recycled gas feeding and/or mixing devices are positioned in the region of the largest cross-section of the chamber, because at this point the gas velocity and density are minimal, thus making possible a particularly intensive admixture of the materials.

A further object is to provide recycled gas feeding and/or mixing devices which are advantageously channels which open tangentially or substantially tangentially into the combustion chamber and are connected to a common supply conduit thereby providing a construction which is simple and of uncomplicated design.

With the above and other objects in view as will be seen from the following detailed description, a preferred modification is shown in the drawings in which.

Figure 1:
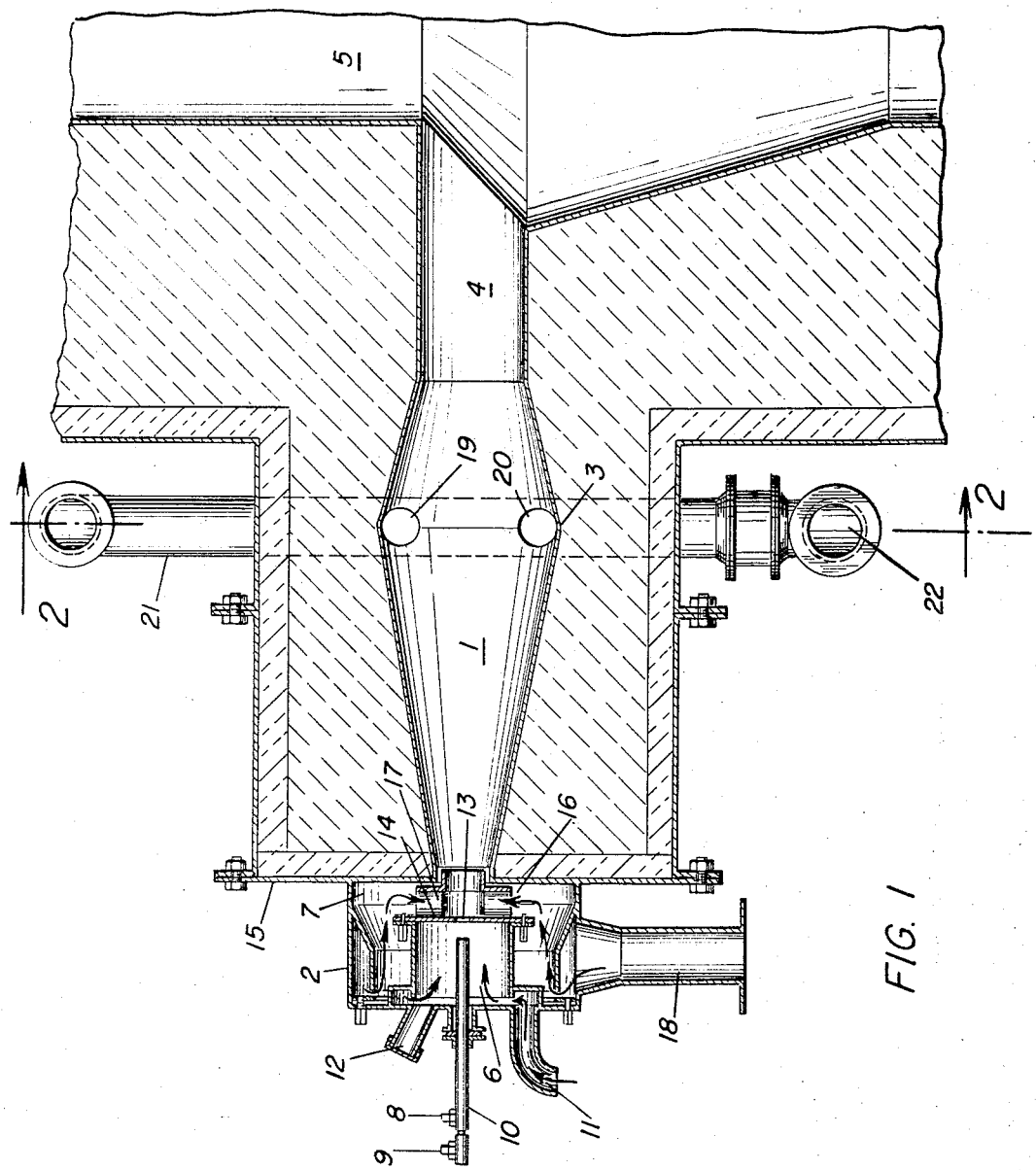
FIGURE 1 is a longitudinal cross-sectional view through a burner.
Figure 2:
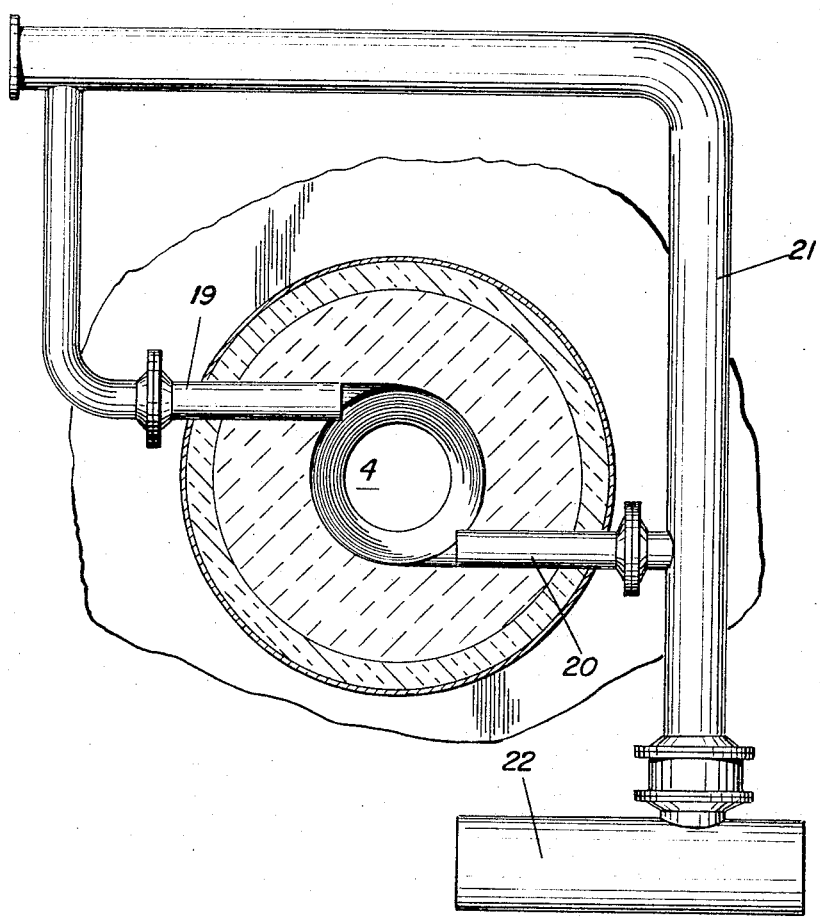
FIGURE 2 is a cross-sectional view taken upon section line 2—2 of FIGURE 1.

In the drawing, 1 designates a rotation-symmetrical combustion chamber, which is of increasing width beginning from the headpiece 2 and which narrows down again after attaining a maximum cross-sectional region 3, and thereafter opens into a cylindrical outlet 4 which is connected to the furnace chamber 5 to be heated.

The headpiece 2 is provided with an inner chamber 6 and an outer chamber 7 annularly disposed therearound. Opening into the inner chamber 6 is a burner nozzle 10 which is provided with a compressed air connection 8 and a fuel connection 9, and also a head-air supply conduit 11, as well as an igniting and inspection opennig 12. The outlet end of the burner nozzle 10, which is disposed concentrically with the combustion chamber 1, is spaced from an opening 13 which is located in a plate 14 which seals off the inner chamber 6 of the headpiece from the combustion chamber 1. Plate 14 in turn is spaced from a front plate 15 of combustion chamber 1, so that between the two plates 14 and 15 there remains a slot 16 in which conduit means 17 are positioned, through which combustion air coming into the outer chamber 7 via a conduit 18, is led into the combustion chamber 1.

In the region of maximum cross-section 3, the combustion chamber 1 is provided with two tangentially arranged conduits 19 and 20 which are interconnected by means of a bridging conduit 21 and are connected to a furnace recycle gas-supplying annular conduit 22. Combustion gas produced during the operation of the burner can be admixed with recycled gas by way of connections 19 and 20 and can thus be so diluted until the resultant gas mixture is most favorable for the material being treated in the furnace.

It is thought that the invention and its advantages will be understood from the foregoing description, and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A burner for liquid, gaseous and pulverulent fuels comprising a combustion chamber, a connection to said combustion chamber for a supply of recycled gas or a mixture of recycled gas and air, said connection to said chamber for said recycled gas being located in the region of the last third of said combustion chamber so as to have a mixing effect with the combustion gas produced in said chamber, means connected to said connection for supplying the recycled gas to said combustion chamber, said combustion chamber being cone shaped widening conically from the fuel inlet and then narrowing after attaining a maximum cross-section and said means connected to said connection are located at substantially the maximum cross-section of said chamber.

2. A burner for liquid, gaseous and pulverulent fuels comprising a combustion chamber, a connection to said combustion chamber for a supply of recycled gas or a mixture of recycled gas and air, said combustion chamber being cone shaped widening conically from the fuel inlet and then narrowing conically tapering after attaining a maximum cross-section and said connection having an opening in said maximum cross-section to supply said gas or gas and air mixture substantially tangentially to the flame.

References Cited

UNITED STATES PATENTS

| | | | |
|---|---|---|---|
| 2,347,797 | 5/1945 | Barnes | 158—1 |
| 2,753,925 | 7/1956 | Campbell et al. | 158—1 |
| 3,001,779 | 9/1961 | Williams | 158—1 |

FREDERICK L. MATTESON, JR., *Primary Examiner.*

E. G. FAVORS, *Assistant Examiner.*